(12) United States Patent
Giannini

(10) Patent No.: US 7,151,978 B2
(45) Date of Patent: Dec. 19, 2006

(54) SYSTEM AND METHOD FOR THE CONTROL OF A PRODUCTION MACHINE

(75) Inventor: Filippo Giannini, Gropello (IT)

(73) Assignee: Siemens Aktiengesellschaft, Munich (DE)

( * ) Notice: Subject to any disclaimer, the term of this patent is extended or adjusted under 35 U.S.C. 154(b) by 32 days.

(21) Appl. No.: 10/921,047

(22) Filed: Aug. 18, 2004

(65) Prior Publication Data

US 2005/0049723 A1    Mar. 3, 2005

(30) Foreign Application Priority Data

Aug. 21, 2003 (DE) .................. 103 38 494

(51) Int. Cl.
*G06F 19/00* (2006.01)
*B29C 39/00* (2006.01)
*B29C 45/00* (2006.01)

(52) U.S. Cl. .................. 700/204; 700/150; 700/170; 700/197; 700/200; 425/140; 425/150; 56/10.8; 57/321

(58) Field of Classification Search .............. 700/28, 700/37, 44, 45, 41, 42, 197, 198, 200, 201, 700/204, 143, 150, 170; 425/140, 150; 56/10.8; 57/321
See application file for complete search history.

(56) References Cited

U.S. PATENT DOCUMENTS 4,007,362 A * 2/1977 Sindermann ............... 715/507
5,420,730 A * 5/1995 Moon et al. .............. 360/77.08
5,997,778 A * 12/1999 Bulgrin ..................... 264/40.1
6,089,849 A * 7/2000 Bulgrin et al. ............ 425/149

FOREIGN PATENT DOCUMENTS

DE    196 03 251 C1    1/1997
DE    198 03 686 A1    8/1999
DE    199 27 126 A1    1/2001

OTHER PUBLICATIONS

Office Action issued in related German Application No. DE 103 38 494.4 and its translation.
Abstract to German Patent No. DE 198 03 686 A1.
Abstract to German Patent No. DE 199 27 126 A1.

* cited by examiner

*Primary Examiner*—Ramesh Patel
(74) *Attorney, Agent, or Firm*—White & Case LLP

(57) ABSTRACT

The disclosure comprises methods for controlling a production machine having a converter controlled drive wherein the applicable converter receives data from its associated drive as well as additional data from the machine and wherein the converter provides actuation commands to the drive and to the machine. Related systems are also disclosed.

24 Claims, 3 Drawing Sheets

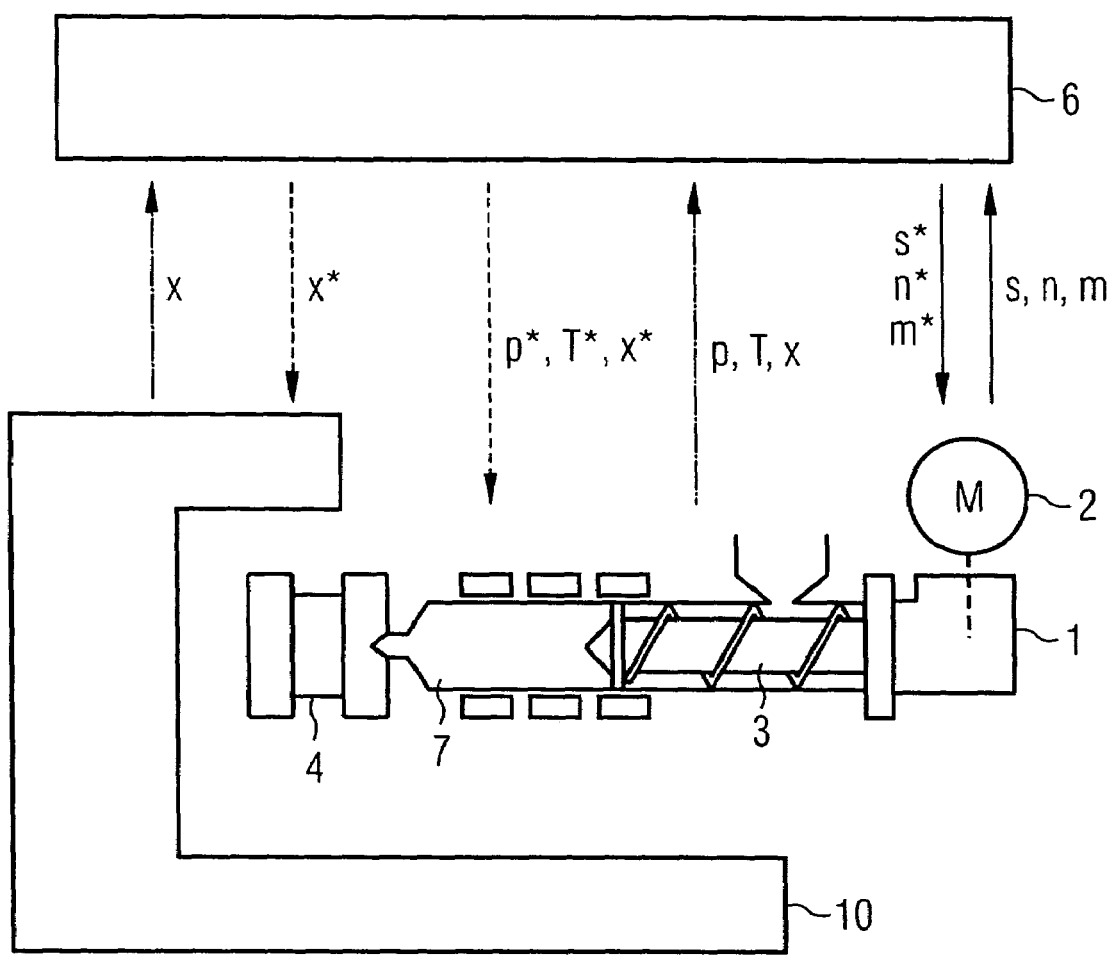

SYSTEM AND METHOD FOR THE CONTROL OF A PRODUCTION MACHINE

FIELD OF THE INVENTION

The present invention relates to a control method for a machine, in particular a production machine, for example a plastics injection-molding machine, with at least one converter-controlled drive, a converter outputting activation commands with a drive clock to the drive and acquiring actual data of the drive.

Every machine with a converter-controlled drive is operated in this way.

BACKGROUND OF THE INVENTION

In particular in the case of production machines, the movement of drives must often be captured by data acquisition and undergo automatic control dependent on process data. For example, the advancement of a screw of a plastics injection-molding machine must be automatically controlled exactly in dependence on the back pressure. Accurate process data acquisition is the basis for the exact reproducibility of the production process carried out by the production machine.

Accurate process data acquisition necessitates high acquisition frequencies and—in the case of analog signals—a high resolution of the analog-digital converters. Furthermore, as many of the process data as possible, preferably all of them, should be acquired time-synchronously, since a time difference between the acquisition of different process data leads to inaccuracies in the subsequent automatic control.

In the prior art, the acquisition of the process data takes place by means of high-speed input modules, by means of which the analog signals to be acquired are digitized. The digitized signals are then transmitted to a higher-level controller, which also supplies the converter with setpoint values.

SUMMARY OF THE INVENTION

The object of the present invention is to design a control method of the type stated at the beginning in such a way that the acquisition of the process data is possible in a more simple and less costly way.

The object is achieved by the converter outputting in addition to the output of the activation commands further activation commands to the machine and/or acquiring in addition to the acquisition of the actual data of the drive further actual data of the machine.

This results in many advantages.

On the one hand, it is possible in a simple way to ensure that the output of the further activation commands takes place synchronously with the output of the activation commands and/or the acquisition of the further actual data takes place synchronously with the acquisition of the actual data of the drive.

The further activation commands and/or the further data may in this case be optionally analog or digital signals.

The drive clock should have a frequency of at least 200 Hz, in particular of 1000 Hz or more. It may be generated internally in the converter. Preferably, however, it is fed to the converter from the outside. This is so because it allows in particular a number of converter-controlled drives, each with their own assigned converter, to be synchronized with one another in a simple way.

The actual data of the drive generally comprise the position, rotational speed and/or torque or current of the drive. In particular in the case of plastics injection-molding machines, the further actual data of the machine generally comprise a temperature and/or a pressure or force. They may also comprise status messages and manual inputs.

In the case of a conventional construction, the control data for the drive are transmitted from a higher-level controller to the converter via a bus. In this case, the converter also transmits the further actual data of the machine to the higher-level controller. It is possible, however, for the further actual data of the machine to be preprocessed, for example smoothed, summated or interpolated by the converter before the transmission to the higher-level controller. The further activation commands—in the same way as the control data for the drive—are likewise transmitted from the controller to the converter via the bus.

On account of the acquisition of the further machine data by the converter, it is possible to implement the higher-level controller in a PC or a microprocessor device. In particular in these cases, it is also possible to form the converter as a decentralized peripheral module and to form the bus as a field bus.

However, as an alternative to the provision of a higher-level controller, it is also possible by the present invention for the converter to control the machine completely.

BRIEF DESCRIPTION OF THE DRAWINGS

Further advantages and details emerge from the description which follows of an exemplary embodiment in conjunction with the drawings, in which, in a basic representation:

FIG. 3 shows the machine from FIG. 1 with a converter.

DETAILED DESCRIPTION OF THE INVENTION

Figure 1:
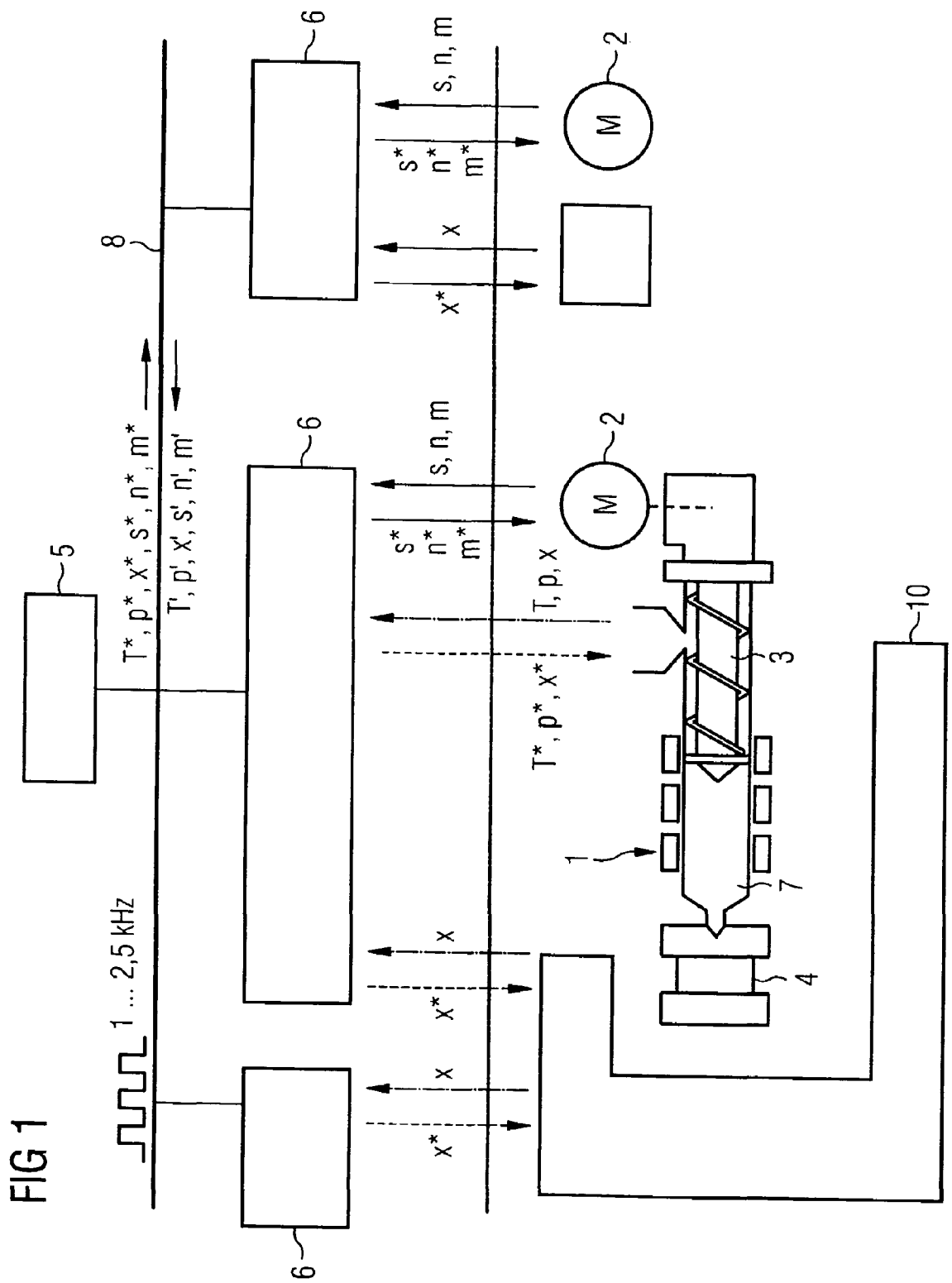
FIG. 1 shows a machine with an associated control system.

According to FIG. 1, a production machine 1, here a plastics injection-molding machine 1, has at least one converter-controlled drive 2. By means of the drive 2, an advancing screw 3 is made to move for example, in order to press plasticized granules into an injection mold 4 (mold 4). As this happens, it is possible to make the speed, the position or the pressure undergo automatic control—even dependent on the state of the process. A purely time-controlled method is also conceivable.

The plastics injection-molding machine 1 is controlled by a control system. The control system has a higher-level controller 5. The higher-level controller 5 is implemented, for example, as a so-called soft programmable controller in a PC or a microprocessor device.

The higher-level controller 5 transmits to a converter 6 control data $s^*$, $n^*$ and/or $m^*$ for the drive 2. The control data $s^*$, $n^*$ and/or $m^*$ comprise in particular a setpoint value $s^*$ for a position $s$, a setpoint value $n^*$ for a rotational speed $n$ and also a setpoint value $m^*$ for a torque $m$ (or a current) of the drive 2. The rotational speed $n$ of the drive 2 corresponds to the advancing speed of the advancing screw 3, the position $s$ of the drive corresponds to the position of the advancing screw 3, the torque $m$ corresponds to the force of the advancing screw 3.

The higher-level controller 5 also transmits further activation commands $p^*$, $T^*$ and/or $x^*$ to the converter 6. The further activation commands p*, T* and/or x* comprise in particular setpoint values p*, T* for a pressure p and a temperature T in a space 7 in front of the screw and also further setpoint values x*. The further setpoint values x* may comprise, for example, a setpoint value for an internal or external metering system, an actuator (for example a piezoelectric actuator), control signals for an operator control and observation panel or a release command for the injection mold 4 for removal of the injection molding.

The control data s*, n* and/or m* and the further activation commands p*, T* and/or x* are transmitted to the converter 6 via a converter-external bus 8. According to FIG. 1, the bus 8 is formed as a field bus 8. Corresponding to this, the converter 6 is formed as a decentralized peripheral module.

According to FIG. 1, a drive clock is also fed to the converter 6 from the outside. The drive clock could, however, also be generated internally in the converter. In the present case, the drive clock has a frequency between 1000 and 2500 Hz. If appropriate, the frequency may also be less than 1000 Hz. However, it should not go below 200 Hz. With this drive clock, the converter 6 outputs the activation commands s*, n*, m* to the drive 2. At the same time, it acquires the actual data s, n, m of the drive 2. The actual data s, n, m comprise in particular the position s, the rotational speed n and the torque m (or the current) of the drive 2.

Synchronously with the output of the activation commands s*, n*, m*, that is in particular also with the drive clock, the converter 6 additionally also outputs the further activation commands p*, T*, x* to the plastics injection-molding machine 1 or a device 10 assigned to the plastics injection-molding machine 1.

In addition to and synchonously with the acquisition of the actual data s, n, m of the drive 2, the converter 6 also acquires further actual data p, T, x of the plastics injection-molding machine 1 or of the assigned device 10. The further actual data p, T and/or x of the plastics injection-molding machine 1 or of the assigned device 10 comprise, for example, the temperature T and the pressure p in the space 7 in front of the screw and, for example, a (binary) status message of a sensor. The signals p, T are analog signals. The further actual data p, T, x also comprise, however, for example the acquired position of the injection mold 4, that is whether it is open or closed. This signal is a digital or binary signal.

The acquired actual data n, s and/or m of the drive 2 and also the acquired further actual data p, T and/or x of the plastics injection-molding machine 1 or of the assigned device 10 are transmitted from the converter 6 to the higher-level controller 5. It is possible in this case to transmit the actual data s, n, m, p, T, x directly to the higher-level controller 5.

Preferably, however, the actual data s, n, m, p, T, x are preprocessed, for example smoothed or averaged, by the converter 6 before the transmission to the higher-level controller 5. This is indicated in FIG. 1 by the data that are transmitted to the higher-level controller 5 respectively having an apostrophe.

The higher-level controller 5 determines on the basis of the actual values s', n', m', p', T', x' obtained whether a step-enabling condition for the plastics injection-molding machine 1 has been achieved. If appropriate, it then outputs new control data s*, n*, m* and/or new activation commands p*, T*, x* to the converter 6.

Figure 2:
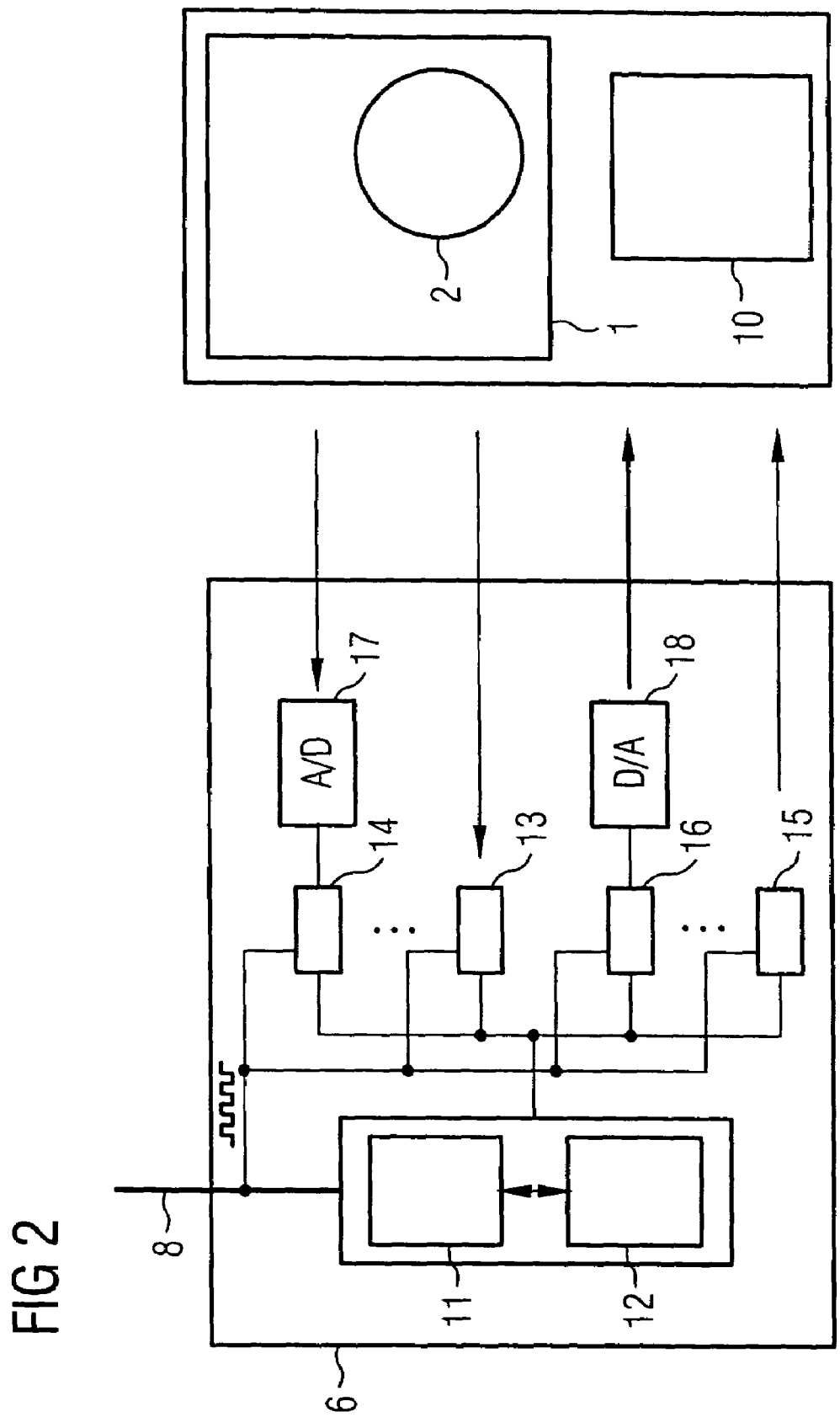
FIG. 2 shows a converter.

According to FIG. 2, the converter 6 internally has a processing unit 11, usually a microprocessor 11, and also a memory 12. The processing unit 11 is in this case connected to the bus 8.

The converter 6 also has input devices 13, 14 and output devices 15, 16. The input and output devices 13 to 16 are likewise connected to the processing unit 11. Furthermore, the drive clock is fed to them.

With each clock, the input units 13, 14 read the actual data n, s, m, p, T, x from the plastics injection-molding machine 1 or the assigned device 10 into internal memories. These memories can then be read out by the processing unit 11. The signal present at the input unit 14 is in this case digitized before storage in the internal memory by means of an analog/digital converter 17.

Similarly, with every clock, an output signal, for example x, is output by the output units 15 to the plastics injection-molding machine 1 or the assigned device 10. The signal output by the input unit 16 is in this case analogized in a digital-analog converter 18. After outputting, a new signal to be output can then be written by the processing unit 11 into internal memories of the output units 15, 16.

The output of an analog signal, the output of a digital signal, the input of an analog signal and the input of a digital signal are described above. It is evident that all the signals are synchronously output to the plastics injection-molding machine 1 or the assigned device 10 or the drive 2 or read in by them.

The processing unit 11 of the converter 6 is generally considerably more powerful than a possible processing unit of a customary high-speed input-output module. It is therefore possible, as schematically indicated in FIG. 3, for the converter 6 to control the injection-molding machine 1 completely. In this case it is possible to dispense with the higher-level controlller 5. The converter-external bus 8 is also not required. The converter 6 in this case represents as it were a stand-alone controller for the plastics injection-molding machine 1.

It is consequently possible by the present invention to execute the acquisition of the further actual data p, T, x of the machine 1 and/or the output of the further activation commands p*, T*, x* to the machine 1 via the converter 6 directly. As a result, not only is an input and output of the process signals achieved time-synchronously with the acquisition of the rotational speed and/or displacement of the drive 2, but also short signal propagation times are achieved. The accuracy of the automatic control can consequently be increased significantly. In an individual case, the entire control can even be realized in the converter 6.

The invention claimed is:

1. A method of controlling a production machine having a converter controlled drive comprising the steps of:
   providing a first set of data to the converter, where the first set of data comprises drive data elements from the converter controlled drive;
   providing a second set of data to the converter, where the second set of data comprises machine data elements from the machine but not from the converter controlled drive;
   issuing a first set of activation commands from the converter, where the first set of activation commands comprises drive activation commands for the converter controlled drive; and
   issuing a second set of activation commands from the converter, where the second set of activation commands comprises machine activation commands for the machine but not for the converter controlled drive.

2. A method according to claim 1 further comprising the step of:
converting a machine data element from analog to digital.

3. A method according to claim 2 further comprising the step of:
converting a machine activation command from digital to analog.

4. A method according to claim 1 further comprising the step of:
providing the converter data elements and providing the machine data elements from the converter to a higher level controller.

5. A method according to claim 4 wherein:
the data elements are transmitted over a field bus using a digital communication protocol.

6. A method according to claim 4 further comprising the step of:
providing activation commands from the higher level controller to the converter.

7. A method according to claim 4 further comprising the step of:
processing machine data elements in the converter.

8. The method according to claim 1 further comprising:
generating activation commands in the converter.

9. The method according to claim 1 wherein:
at least one machine data element is provided to the converter in digital form.

10. The method according to claim 1 wherein:
the machine data elements and the drive data elements are read synchronously by the converter in accordance with a clock signal.

11. A method according to claim 1 further comprising the step of:
providing a third set of data to the converter, where the third set of data is comprised of auxiliary device data elements from an auxiliary device.

12. A method according to claim 1 further comprising the step of:
issuing a third set of activation commands from the converter, where the third set of activation commands is comprised of auxiliary device activation commands for an auxiliary device.

13. A production machine comprising:
a converter controlled drive; and
a converter;
wherein
a plurality of drive data elements are provided from the converter controlled drive to the converter;
a plurality of machine data elements are provided from the machine to the converter controlled drive;
converter activation commands are provided from the converter to the converter controlled drive; and
machine activation commands are provided from the converter to the machine.

14. The production machine of claim 13 further comprising:
an auxiliary device;
wherein
at least one auxiliary device data element is provided from the auxiliary device to the converter; and
at least one auxiliary device activation command is provided from the converter to the auxiliary device.

15. The production machine of claim 13 further comprising:
a higher level controller; and
a field bus;
wherein the higher level controller communicates with the converter over the field bus.

16. The production machine of claim 15 further wherein:
the higher level controller is a personal computer.

17. The production machine of claim 13 further comprising:
a microprocessor and associated memory.

18. The production machine of claim 17 wherein:
the machine data is processed by the microprocessor.

19. The production machine of claim 13 further comprising:
a plurality of digital to analog converters.

20. The production machine of claim 19 further comprising:
a plurality of buffers;
wherein each of the plurality of digital to analog converters provides a digital output to one of the plurality of buffers.

21. The production machine of claim 20 wherein:
at least one of the plurality of buffers receives a machine data element directly from the machine in digital form.

22. The production machine of claim 20 wherein:
each of the plurality of buffers reads a digital input signal synchronously in accordance with a timing signal.

23. The production machine of claim 13 wherein:
activation commands are generated in the converter.

24. The production machine of claim 23 wherein:
the converter controls the machine without the aid of a higher level processor.

* * * * *